(12) United States Patent
Lee et al.

(10) Patent No.: US 11,262,490 B2
(45) Date of Patent: Mar. 1, 2022

(54) OPTICAL DEVICE AND METHOD OF OUTPUTTING LIGHT BY USING THE SAME

(71) Applicant: SAMSUNG ELECTRONICS CO., LTD., Suwon-si (KR)

(72) Inventors: Kyookeun Lee, Suwon-si (KR); Kyusub Kwak, Suwon-si (KR); Wonjun Lee, Suwon-si (KR); Myongjo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 94 days.

(21) Appl. No.: 16/727,221

(22) Filed: Dec. 26, 2019

(65) Prior Publication Data

US 2020/0209447 A1  Jul. 2, 2020

(30) Foreign Application Priority Data

Dec. 26, 2018 (KR) .......................... 10-2018-0169911

(51) Int. Cl.
  *G02B 5/18* (2006.01)
  *G02B 27/01* (2006.01)
  *G03H 1/26* (2006.01)

(52) U.S. Cl.
  CPC .......... *G02B 5/1819* (2013.01); *G02B 5/1842* (2013.01); *G02B 27/0172* (2013.01); *G03H 2001/264* (2013.01)

(58) Field of Classification Search
  CPC .............. G02B 5/1819; G02B 5/1842; G02B 27/0172; G02B 2027/0112;
  (Continued)

(56) References Cited

U.S. PATENT DOCUMENTS 6,580,529 B1    6/2003  Amitai et al.
2006/0126179 A1*  6/2006  Levola ............... G02B 27/4272
                                                     359/563
(Continued)

FOREIGN PATENT DOCUMENTS

KR  10-2018-0009130 A   1/2018
WO     2018/125574 A1   7/2018
(Continued)

OTHER PUBLICATIONS

International Search Report (PCT/ISA/210) and Written Opinion (PCT/ISA/237) dated Apr. 8, 2020, issued by the International Searching Authority in International Application No. PCT/KR2019/018395.

(Continued)

*Primary Examiner* — Kimberly N. Kakalec
(74) *Attorney, Agent, or Firm* — Sughrue Mion, PLLC

(57) ABSTRACT

Provided are an optical device and a method of outputting light using the optical device. The optical device includes a waveguide, a first diffraction grating receiving at least a portion of light incident on the waveguide and a second diffraction grating receiving a light diffracted from the first diffraction grating, wherein the first diffraction grating and the second diffraction grating are provided in or on the waveguide, the light diffracted from the first diffraction grating is diffracted, in three-dimensional directions, from the second diffraction grating, and at least a portion of the light diffracted in the three-dimensional directions is output to an outside of the waveguide.

15 Claims, 12 Drawing Sheets

(58) Field of Classification Search
CPC ........ G02B 2027/0174; G02B 27/0081; G02B 27/4272; G02B 27/0101; G03H 2001/264; G03H 1/0402; G03H 1/0408; G03H 2001/0439
See application file for complete search history.

(56) References Cited

U.S. PATENT DOCUMENTS

| | | |
|---|---|---|
| 2007/0188837 A1 | 8/2007 | Shimizu et al. |
| 2016/0377879 A1 | 12/2016 | Popovich et al. |
| 2018/0017801 A1 | 1/2018 | Chang et al. |
| 2018/0052501 A1 | 2/2018 | Jones, Jr. et al. |
| 2018/0164591 A1 | 6/2018 | Saarikko |
| 2018/0210205 A1* | 7/2018 | Grey ................. G02B 27/0172 |

FOREIGN PATENT DOCUMENTS

| | | |
|---|---|---|
| WO | 2018/194962 A1 | 10/2018 |
| WO | 2018/220266 A1 | 12/2018 |

OTHER PUBLICATIONS

Sreekanth, et al., "Four beams surface plasmon interference nanoscale lithography for patterning of two-dimensional periodic features", 2010, American Vacuum Society, XP 012143913, 3 pages total.
Communication dated Sep. 28, 2021 by the European Patent Office in European Application No. 19905517.9.

* cited by examiner

OPTICAL DEVICE AND METHOD OF OUTPUTTING LIGHT BY USING THE SAME

CROSS-REFERENCE TO RELATED APPLICATION

This application is based on and claims priority under 35 U.S.C. § 119 to Korean Patent Application No. 10-2018-0169911, filed on Dec. 26, 2018, in the Korean Intellectual Property Office, the disclosure of which is incorporated by reference herein in its entirety.

BACKGROUND

1. Field

The disclosure relates to an optical device and a method of outputting light by using the optical device.

2. Description of Related Art

Augmented reality (AR) technology is technology whereby a virtual object or information is combined with a real environment such that the virtual object or information appears to exist in the real environment. Modern computing and display technologies have enabled the development of systems for AR experiences in which a digitally reconstructed image or part thereof is presented to a user such that it can be considered or perceived as reality by the user.

As much attention has been paid to AR technology, various technologies for realizing AR are actively being developed. In particular, research has been conducted on near-eye display technology for displaying an image such that the image is projected directly onto a user's retinas. For example, research has been conducted on various types of optical elements, as optical elements are needed to output light forming an image to a transparent display of AR glasses or the like and transmit the light to a user's retinas. Despite this research, optical loss occurs during transmission of light to a user's retinas via optical elements, and thus there is still a need for research on optical elements capable of reducing optical loss.

SUMMARY

Provided are an optical device providing a diffraction grating structure to reduce optical loss during transmission of light to a user's retinas via a waveguide, and a method of outputting light using the same.

Additional aspects will be set forth in part in the description which follows and, in part, will be apparent from the description, or may be learned by practice of the presented embodiments.

In accordance with an embodiment, there is provided an optical device including a waveguide, a first diffraction grating receiving at least a portion of light incident on the waveguide; and a second diffraction grating receiving a light diffracted from the first diffraction grating, wherein the first diffraction grating and the second diffraction grating are provided in or on the waveguide, the light diffracted from the first diffraction grating is diffracted, in three-dimensional directions, from the second diffraction grating, and at least a portion of the light diffracted in the three-dimensional directions is output to an outside of the waveguide.

The second diffraction grating may include gratings of a pattern based on directions of grating vectors corresponding to sides of a polyhedron inscribed in a sphere, and wherein the light diffracted from the first diffraction grating to the second diffraction grating is diffracted in the three-dimensional directions based on a sum of a one dimensional direction of the light diffracted from the first diffraction grating to the second diffraction grating and the directions of the grating vectors.

The second diffraction grating may include gratings of a pattern recorded based on (n+1) beams of light interfering with an n-sided truncated pyramid.

The second diffraction grating may include a volume grating.

The second diffraction grating may include gratings of which at least one of efficiency of diffraction in the three-dimensional directions or light-output efficiency are differently recorded.

The optical device may further include a plurality of waveguides, each of the plurality of waveguides including the first diffraction grating and the second diffraction grating, the plurality of waveguides are stacked, and a red image signal light, a green image signal light, and a blue image signal light incident on the first diffraction grating and the second diffraction grating of each of the plurality of waveguides are selectively diffracted based on wavelength characteristics of the red image signal light, the green image signal light, and the blue image signal light.

The second diffraction grating may include at least one of a photopolymer, gelatin, a silver halide, and a photoresist.

The optical device may further include a processor configured to output light forming a virtual image to the first diffraction grating.

In accordance with an embodiment, there is provided a method of outputting light, the method including recording a pattern of a waveguide based on a plurality of beams of light interfering with a truncated pyramid, the waveguide providing a first diffraction grating and a second diffraction grating that includes the recorded pattern; and outputting light to the first diffraction grating of the waveguide, wherein at least a portion of the light incident on the first diffraction grating is diffracted to the second diffraction grating, a light diffracted from the first diffraction grating is diffracted, in three-dimensional directions, from the second diffraction grating, and at least a portion of the light diffracted in the three-dimensional directions is output to an outside of the waveguide.

The second diffraction grating may include gratings of a pattern based on directions of grating vectors corresponding to sides of a polyhedron inscribed in a sphere, and wherein the light diffracted from the first diffraction grating to the second diffraction grating is diffracted in the three-dimensional directions based on a sum of a one-dimensional direction of the light diffracted from the first diffraction grating to the second diffraction grating and the directions of the grating vectors.

The second diffraction grating may include gratings of a pattern recorded based on (n+1) beams of light interfering with an n-sided truncated pyramid.

The second diffraction grating may include a volume grating.

The second diffraction grating may include gratings of which at least one of efficiency of diffraction in the three-dimensional directions or light-output efficiency are differently recorded.

The outputting of the light to the first diffraction grating of the waveguide may include outputting a red image signal light, a green image signal light, and a blue image signal light, wherein the red image signal light, the green image signal light, and the blue image signal light incident on a first diffraction grating and a second diffraction grating of a plurality of waveguides are selectively diffracted based on wavelength characteristics of the red image signal light, the green image signal light, and the blue image signal light.

The second diffraction grating may include at least one of a photopolymer, gelatin, a silver halide, and a photoresist.

The second diffraction grating may include gratings of a pattern recorded based on (n+1) beams of light interfering with an n-sided truncated pentagonal pyramid.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
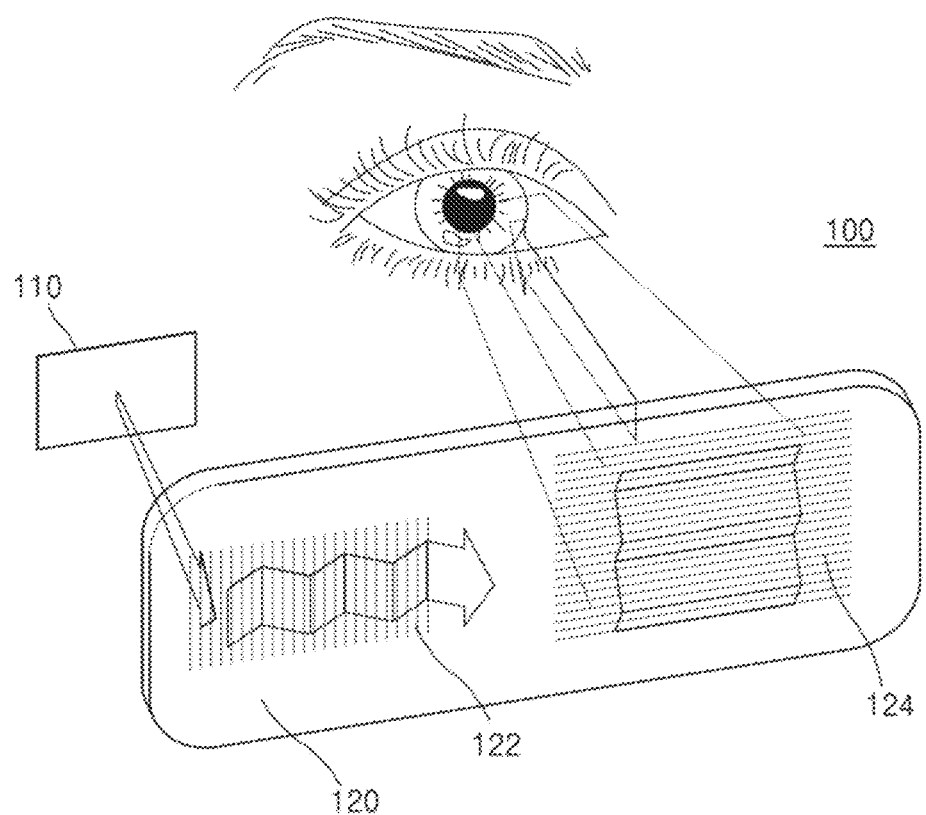
FIG. 1 is a conceptual diagram illustrating a method of outputting light by an optical device according to an embodiment.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Accordingly, the terms used herein should be defined not based on the names thereof but based on the meanings thereof and the whole context of the disclosure.

It will be understood that, although the terms first, second, etc., may be used herein to describe various elements, the elements should not be limited by these terms. These terms are only used to distinguish one element from another element. For example, a first element could be termed a second element without departing from the scope of the disclosure. Similarly, a second element could be termed a first element. As used herein, the term "and/or" includes any and all combinations of one or more of the associated listed items.

It will be understood that when an element is referred to as "including" another element, the element may further include other elements unless mentioned otherwise. The term "unit" used herein should be understood as software or a hardware component, such as a field-programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, for example, the term "unit" may include components, such as software components, object-oriented software components, class components, and task components, functions, attributes, procedures, subroutines, segments of program code, drivers, firmware, microcode, a circuit, data, database, data structures, tables, arrays, and parameters. Functions provided in components and "units" may be combined to obtain a small number of components and "units" or divided into sub-components and "sub-units".

Embodiments of the disclosure will be described in detail with reference to the accompanying drawings below so that those of ordinary skill in the art may easily implement them. However, the disclosure may be embodied in many different forms and is not limited to embodiments set forth herein. In the drawings, for clarity, parts that are not related to describing the disclosure are omitted. Throughout the specification, like reference numerals are assigned to like elements. Throughout the disclosure, the expression "at least one of a, b or c" indicates only a, only b, only c, both a and b, both a and c, both b and c, all of a, b, and c, or variations thereof.

FIG. 1 is a conceptual diagram illustrating a method of outputting light by an optical device 100 according to an embodiment.

Referring to FIG. 1, the optical device 100 may output a virtual image to be superimposed on a real world image such that a user may experience augmented reality (AR). For example, the optical device 100 may output light forming the virtual image to at least one optical element such that the light arrives at a user's retinas.

In an embodiment, the optical device 100 may be capable of enabling the output light to be perceived by the user's eyes through a more efficient scheme. A method of outputting light according to the disclosure will be described in detail with respect to elements of the optical device 100 below.

In an embodiment, the optical device 100 may include a display engine 110, a waveguide 120, a first diffraction grating 122 and a second diffraction grating 124. However, these elements are merely examples and the optical device 100 according to an embodiment may further include other elements or may include only some of these elements. For example, the optical device 100 may include the waveguide 120, the first diffraction grating 122, and the second diffraction grating 124. As another example, the optical device 100 may further include a plurality of waveguides, a plurality of first diffraction gratings, and a plurality of second diffraction gratings.

In the present disclosure, diffraction grating may be a holographic optical element (HOE). The first diffraction grating and the second diffraction grating may be an in-coupling HOE and an out-coupling HOE, respectively.

The display engine 110 may output light forming a virtual image. For example, the display engine 110 may output light of a red (R) image signal, light of a green (G) image signal, and light of a blue (B) image signal which are included in the virtual image. A light source of the light output from the display engine 110 may include at least one of a fluorescent lamp, a light-transmitting diode (LED), or laser. The light source may include a plurality of light sources including R, G, and B colors.

The light output from the display engine 110 may be incident on the first diffraction grating 122 provided on the waveguide 120. The light incident on the first diffraction grating 122 may be diffracted and incident on the second diffraction grating 124. For example, the light incident on the first diffraction grating 122 may be diffracted in a direction of 90 degrees from a direction of incidence of the light output from the display engine 110, and be thereafter incident on the second diffraction grating 124 along the waveguide 120.

In an embodiment, the second diffraction grating 124 may diffract at least a portion of the light received from the first diffraction grating 122 in three-dimensional (3D) directions. Here, the diffraction of the at least a portion of the light in the 3D directions may include the light incident on the second diffraction grating 124 being three-dimensionally transmitted. In an embodiment, the second diffraction grating 124 may include gratings of a pattern for diffracting light incident thereon in the 3D directions. A range of the light diffracted by the first diffraction grating 122 and received by the second diffraction grating 124 may be increased through the diffraction of the light in the 3D directions by the second diffraction grating 124. A direction of diffraction of a portion of the light diffracted in the 3D directions by the second diffraction grating 124 may be a direction toward the outside of the waveguide 120 to transmit the light to the user's eyes.

For example, the second diffraction grating 124 may have a pattern corresponding to directions and a size of grating vectors corresponding to the sides of a polyhedron inscribed in a sphere. A 3D output vector may be formed from the sum of a vector of the light incident on the second diffraction grating 124 and the grating vectors, as will be described in more detail with reference to FIG. 5 below.

Generally, a diffraction grating diffracts light incident thereon in a one-dimensional (1D) direction but the second diffraction grating 124 according of the disclosure may be capable of diffracting light in the 3D directions according to the pattern thereof. That is, the second diffraction grating 124 may diffract the light received from the first diffraction grating 122 in the 3D directions to widen an eye motion box (EMB) without including additional diffraction gratings.

In a related optical device, light is diffracted by addition-ally arranging a diffraction grating between a first diffraction grating and a second diffraction grating, and thus luminous efficiency sharply decreases when the light passes through the three diffraction gratings. Whereas in the optical device 100 according to the embodiment, light may diffracted in the 3D directions according to the pattern on the second diffraction grating 124 without passing through an additional diffraction grating between the first diffraction grating 122 and the second diffraction grating 124, thereby increasing luminous efficiency.

In an embodiment, the optical device 100 may be in the form of an eyewear. For example, the optical device 100 may be an eyewear which displays one or more virtual images and may be configured to be worn in front of a user's eyes.

A method of outputting light by an optical device according to an embodiment will be described in more detail with reference to FIGS. 2 to 11.

Figure 2:
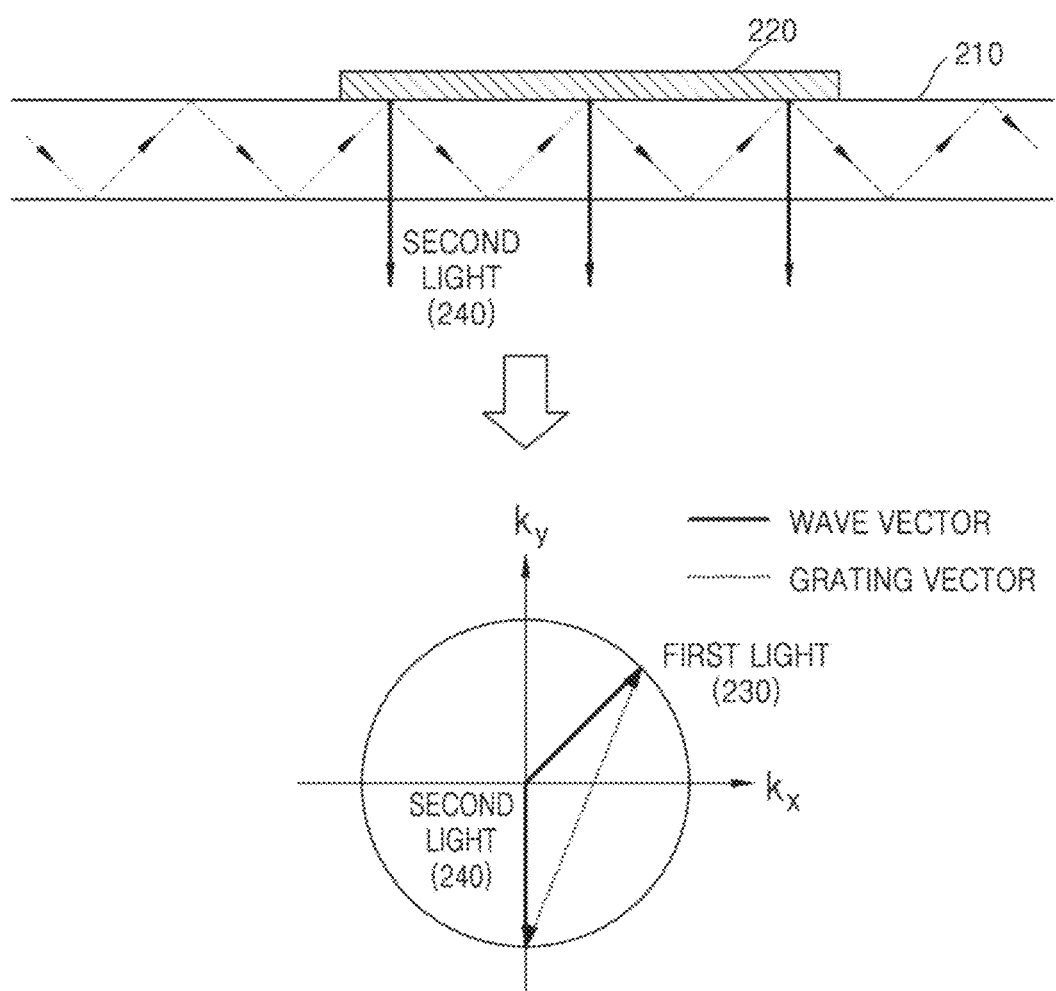
FIG. 2 is a diagram illustrating diffraction gratings of an optical device according to an embodiment.

FIG. 2 is a diagram illustrating diffraction gratings of an optical device according to an embodiment.

Referring to FIG. 2, a first diffraction grating and a second diffraction grating 220 may be provided on a waveguide 210 of an optical device. According to the embodiment, light diffracted by the first diffraction grating in a 1D direction may be first light 230. The first light 230 may be incident on the second diffraction grating 220 along the waveguide 210.

Figure 3:
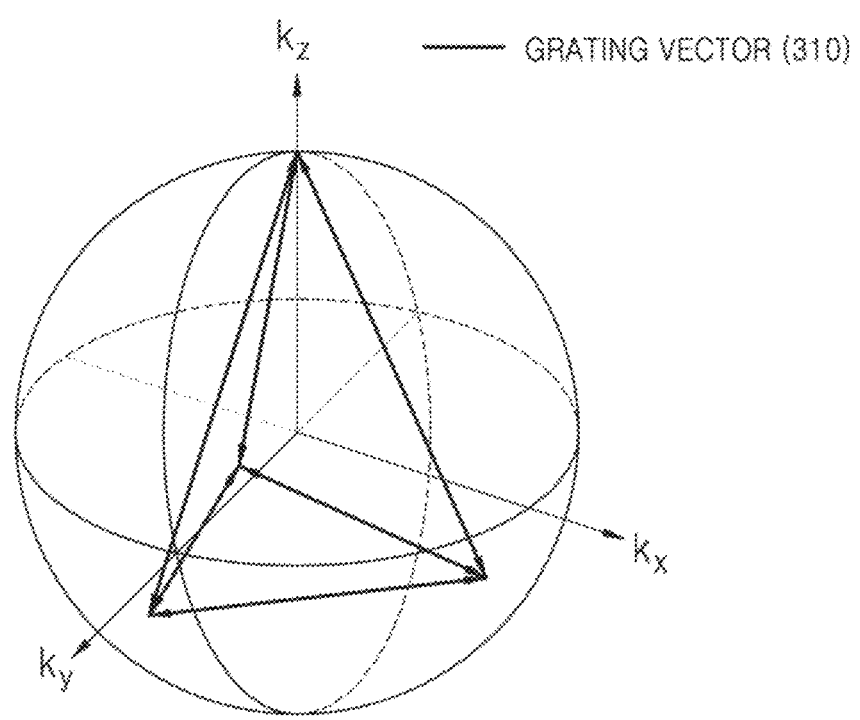
FIG. 3 is a diagram illustrating diffraction gratings recorded using a triangular pyramid according to an embodiment.

In an embodiment, the second diffraction grating 220 may include gratings of a pattern recorded based on (n+1) beams of light interfered with an n-sided sided truncated pyramid. FIG. 3 is a diagram illustrating diffraction gratings recorded using a triangular pyramid according to an embodiment. For example, when gratings are recorded using a truncated triangular pyramid, grating vectors may correspond to the sides of a polyhedron inscribed in a sphere.

Referring to FIG. 3, when grating are recorded using the truncated triangular pyramid, grating vectors 310 may correspond the sides of a tetrahedron inscribed in a sphere. In this case, six pairs of grating vectors 310, i.e., a total of twelve grating vectors 310, may be formed with respect to directions of the sides of the tetrahedron.

Referring to FIG. 2, the first light 230 incident on the second diffraction grating 220 may be diffracted in 3D directions by the gratings of the second diffraction grating 220. Second light 240 illustrated in FIG. 2 is an example of a beam of light emitted in the 3D directions as a result of diffracting the first light 230 by using the second diffraction grating 220. A vector v0 representing the second light 240 may be obtained from the sum of a vector vi representing the first light 230 and grating vectors vg. Here, the grating vectors vg may correspond to the sides of a tetrahedron inscribed in a sphere as described above with reference to FIG. 3. However, the grating vectors vg are merely an example when gratings are recorded using a truncated triangular pyramid, and thus are not limited thereto. As an example, grating vectors may be used when another n-sided truncated pyramid, for example, a truncated pentagonal pyramid is used. However, embodiments are not limited thereto.

Figure 4:
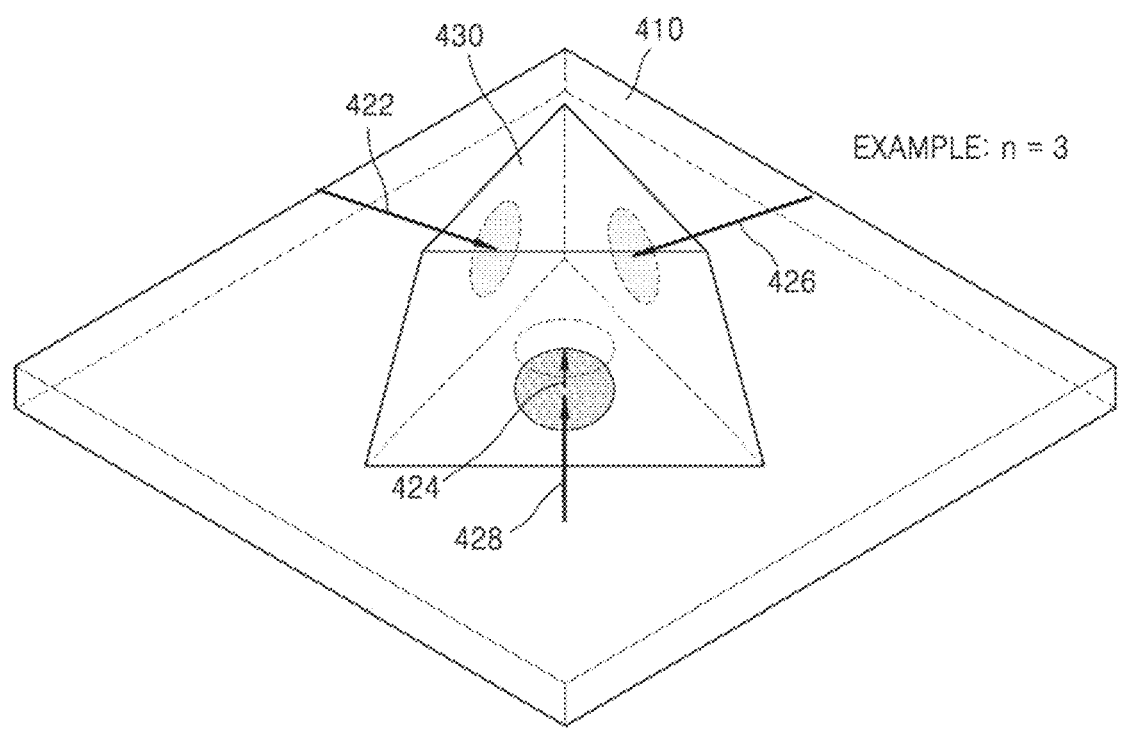
FIG. 4 is a diagram illustrating a truncated triangular pyramid used to record a diffraction grating of an optical device according to an embodiment.

FIG. 4 is a diagram illustrating a truncated triangular pyramid 430 used to record a diffraction grating of an optical device according to an embodiment.

Referring to FIG. 4, gratings of a second diffraction grating 410 according to an embodiment may be recorded using four beams of light 422, 424, 426, and 428 interfering with a truncated triangular pyramid such that incident light is diffracted in a 3D radial pattern. In this case, the second diffraction grating 410 may include, for example, at least one of a photopolymer, gelatin, silver halide or photoresist.

The gratings recorded using the truncated triangular pyramid 430 may be represented using grating vectors corresponding to the sides of a tetrahedron inscribed in a sphere as described above with reference to FIG. 3.

In an embodiment, light-output efficiencies of the gratings may be set differently to adjust the intensity of light output from the second diffraction grating 410. For example, the light-output efficiencies of the gratings may be set differently by adjusting an output of light to be used for recording or using a mask. In an embodiment, efficiency of diffraction of the gratings of the second diffraction grating 410 in 3D directions in response to light may be set differently.

A viewing angle may be widened by performing recording on the second diffraction grating 410 several times using the truncated triangular pyramid 430. For example, when recording is performed once, only light incident in a predetermined direction may be diffracted in the 3D directions. That is, even when a direction of incidence of light slightly deviates from the predetermined direction, the light may not be diffracted in the 3D directions.

Accordingly, in case that light incident on the second diffraction grating 410 deviates from the predetermined direction, an output of the light may be controlled to diffract the light in the 3D directions by performing recording on the second diffraction grating 410 several times using the truncated triangular pyramid 430, when a degree of the deviation of the light is within a certain range.

Figure 5:
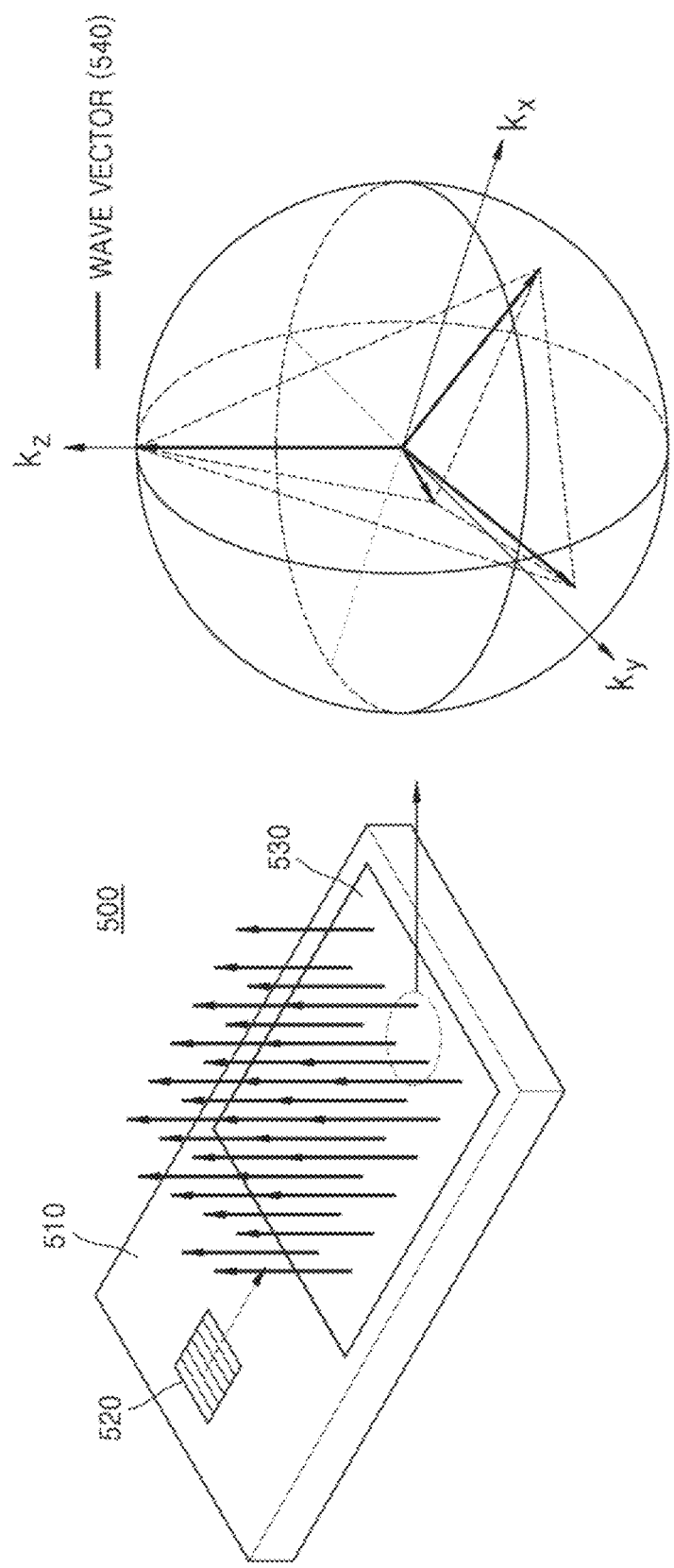
FIG. 5 is a diagram illustrating a method of outputting light by an optical device including a second diffraction grating recorded using a truncated triangular pyramid according to an embodiment.

FIG. 5 is a diagram illustrating a method of outputting light by an optical device 500 including a second diffraction grating 530 recorded using a truncated triangular pyramid according to an embodiment.

Referring to FIG. 5, the optical device 500 may include a waveguide 510, a first diffraction grating 520, and a second diffraction grating 530. According to an embodiment, the second diffraction grating 530 may include gratings of a pattern according to grating vectors corresponding to the sides of a tetrahedron inscribed in a sphere when recording is performed using the truncated triangular pyramid.

Light forming a virtual image may be incident on the first diffraction grating 520 provided on the waveguide 510, and diffracted in a 1D direction. For example, when light is incident on the first diffraction grating 520 in a z-axis direction, at least a portion of the incident light is diffracted in the 1D direction, and thus the incident light may be diffracted, for example, in an x-axis direction. The light diffracted in the x-axis direction may be incident on the second diffraction grating 530. The light diffracted in the x-axis direction is diffracted in 3D directions by gratings of the second diffraction grating 530 and at least a portion of the diffracted light may be transmitted to the outside of the waveguide 510.

In FIG. 5, a wave vector 540 representing light diffracted in the 3D directions is illustrated in the sphere. A vector of the light incident on the second diffraction grating 530 may be combined with grating vectors corresponding to the sides of a tetrahedron inscribed in the sphere, and thus light having a size and shape corresponding to the wave vector 540 may be output.

Figure 6:
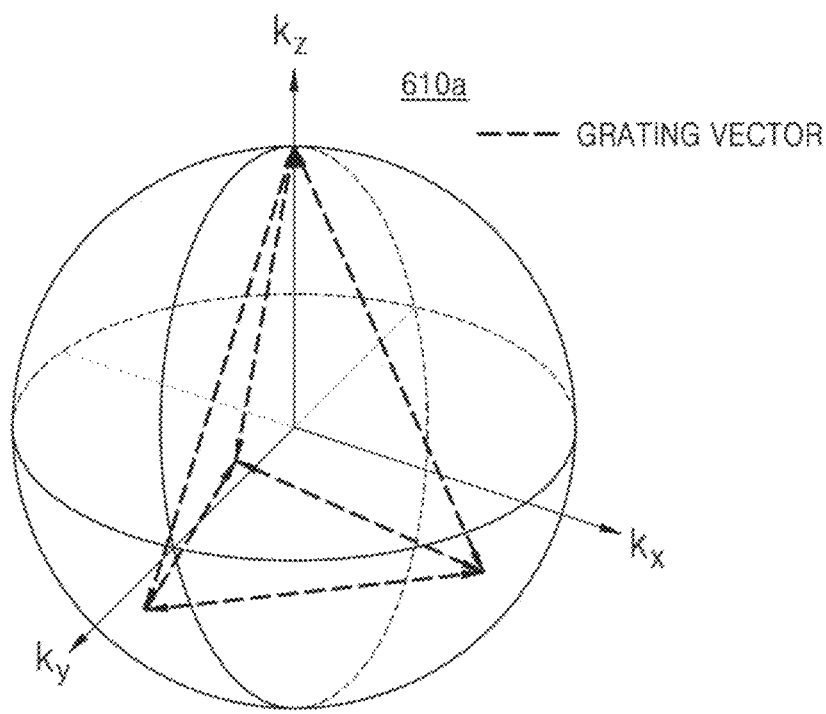
FIG. 6 is a diagram illustrating a grating vector according to an embodiment.
Figure 6:
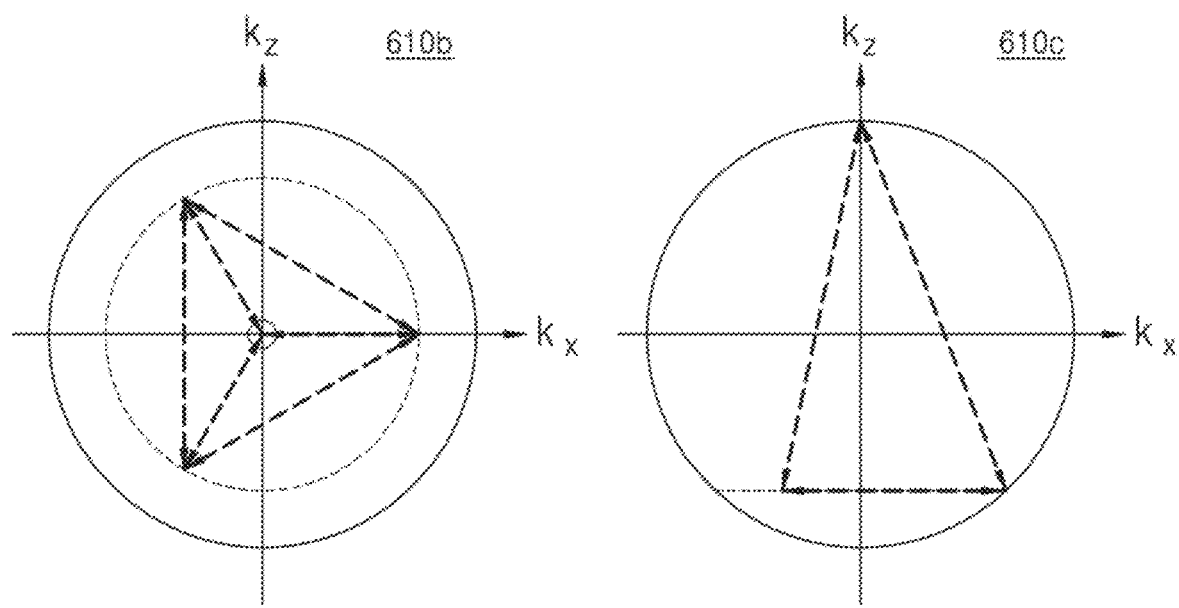

FIG. 6 is a diagram illustrating a grating vector according to an embodiment.

Referring to FIG. 6, grating vectors represent an xyz plane 610a, an xy plane 610b and an xz plane 610c. In the embodiment, a second diffraction grating may be recorded using a truncated triangular pyramid, and thus grating vectors may represent the sides of a tetrahedron inscribed in a sphere.

Figure 7:
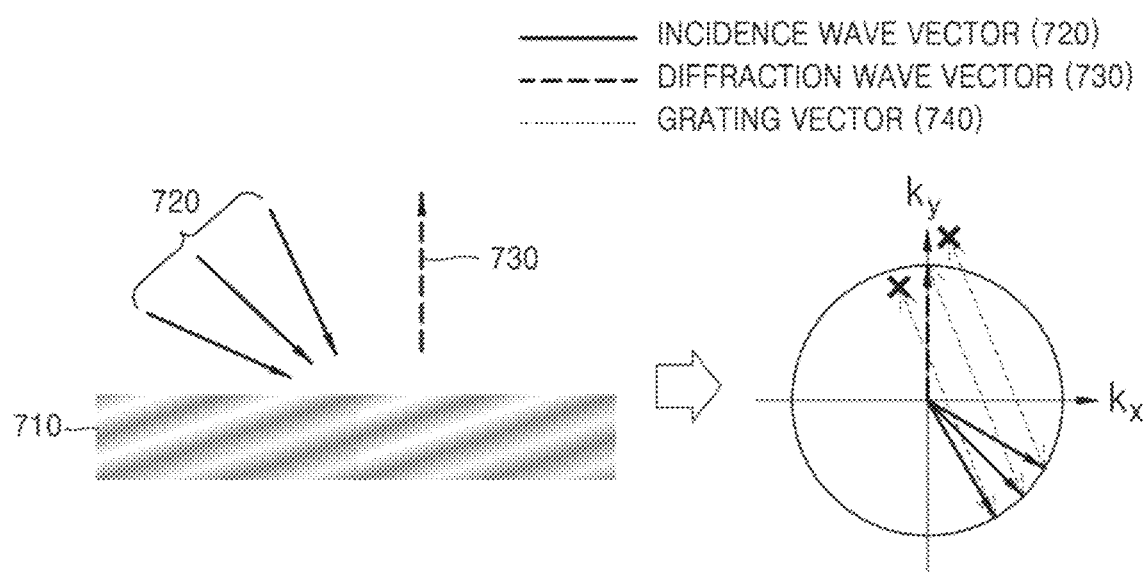
FIG. 7 is a diagram illustrating an optical structure of a diffraction grating according to an embodiment.

FIG. 7 is a diagram illustrating an optical structure of a diffraction grating 710 according to an embodiment.

Referring to FIG. 7, a spatial refractive index of the diffraction grating 710 in the volume thereof is variable to correspond to a pattern of grating vectors as described above. A diffraction wave vector 730 representing light output from the diffraction grating 710 may be obtained from the sum of incidence wave vectors 720 representing light incident on the diffraction grating 710 and grating vectors 740.

Figure 8A:
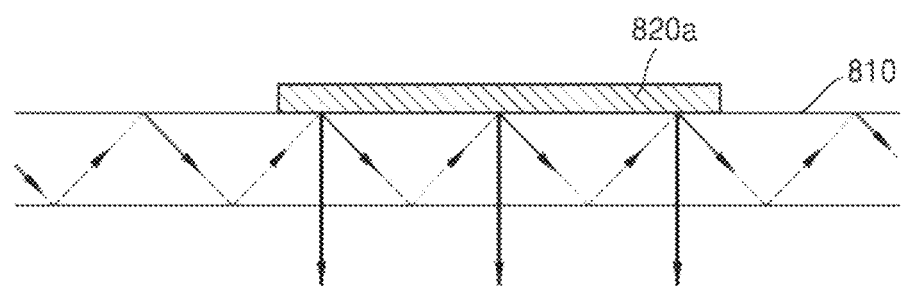
FIG. 8A is a diagram illustrating an example of a position of a diffraction grating on a waveguide according to an embodiment.
Figure 8B:
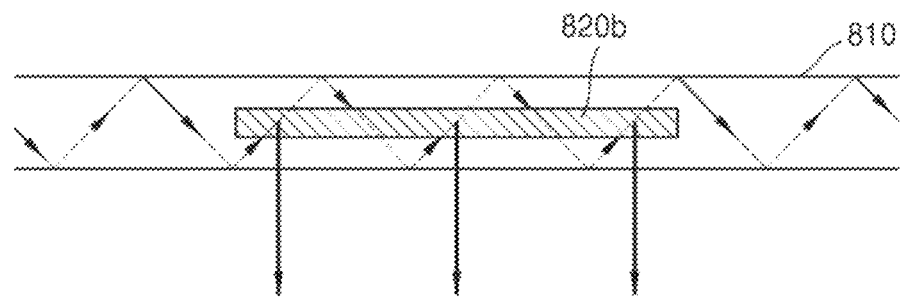
FIG. 8B is a diagram illustrating an example of a position of a diffraction grating in a waveguide according to an embodiment.
Figure 8C:
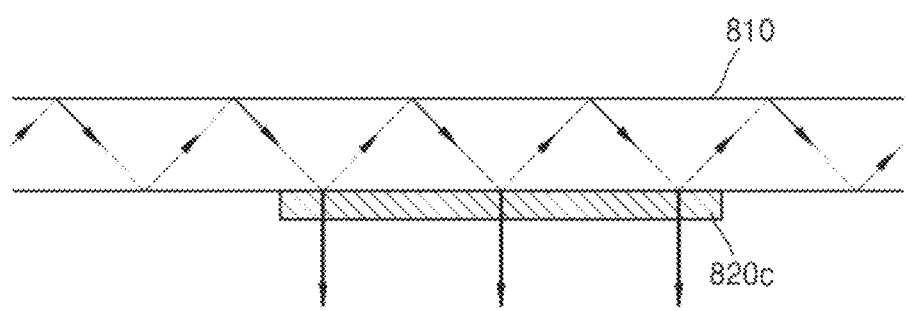
FIG. 8C is a diagram illustrating an example of a position of a diffraction grating on a waveguide according to an embodiment.
Figure 8D:
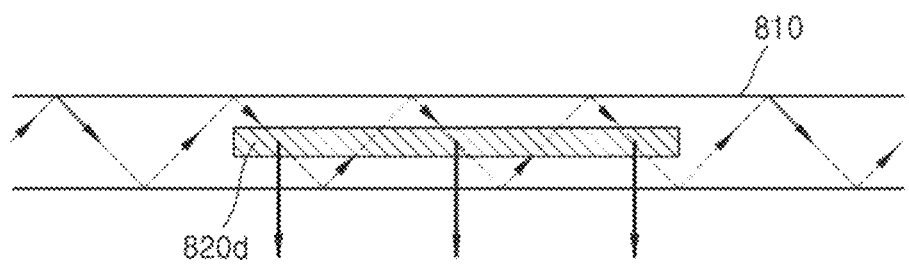
FIG. 8D is a diagram illustrating an example of a position of a diffraction grating in a waveguide according to an embodiment.

The diffraction grating 710 may be located on a surface of or inside a waveguide. FIG. 8A is a diagram illustrating an example of a position of a diffraction grating on a waveguide 810. FIG. 8B is a diagram illustrating an example of a position of a diffraction grating in a waveguide 810. FIG. 8C is a diagram illustrating an example of a position of a diffraction grating on a waveguide 810. FIG. 8D is a diagram illustrating an example of a position of a diffraction grating in a waveguide 810. Referring to FIGS. 8A and 8C, each of diffraction gratings 820a and 820c may be provided on an upper surface and a lower surface of the waveguide 810. Referring to FIGS. 8B and 8D, each of diffraction gratings 820b and 820d may be provided inside the waveguide 810. In this case, as described above with reference to FIG. 2, light incident on, for example, the diffraction grating 820a may be diffracted in 3D directions by gratings of the diffraction grating 820a and at least a portion of the light diffracted in the 3D directions may be transmitted to the outside of the waveguide 810.

Referring back to FIG. 7, when the diffraction grating 710 according to the embodiment responds to a certain wavelength, and thus, for example, light of an R image signal, light of a G image signal, and light of a B image signal of a virtual image are incident, the light of the B image signal may be diffracted.

Figure 9:
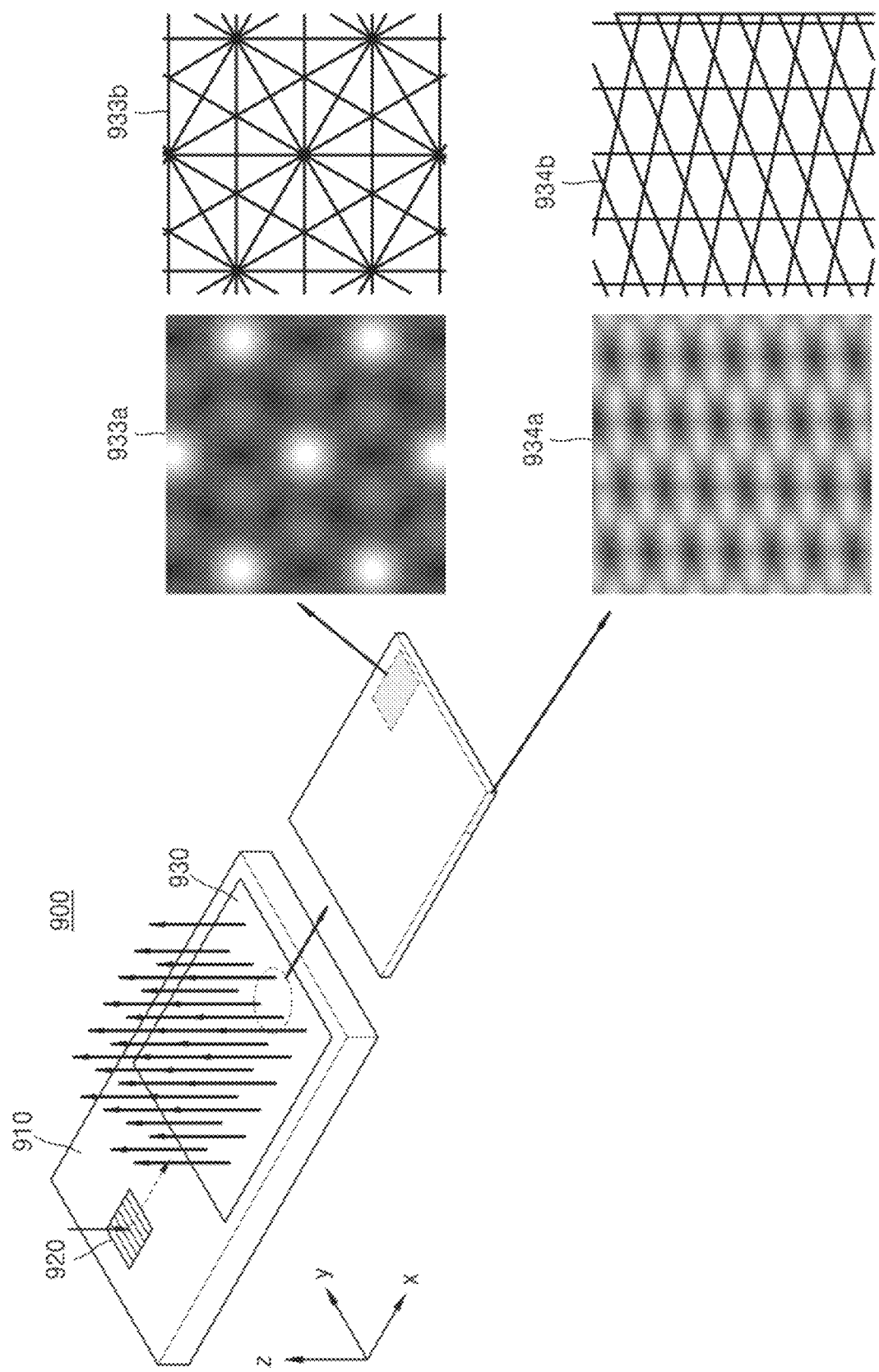
FIG. 9 is a diagram illustrating characteristics of a grating vector according to an embodiment.

FIG. 9 is a diagram illustrating characteristics of a grating vector according to an embodiment.

Referring to FIG. 9, an optical device 900 may include a waveguide 910, a first diffraction grating 920, and a second diffraction grating 930. In the embodiment, the second diffraction grating 930 may include gratings of a pattern according to grating vectors corresponding to the sides of a tetrahedron inscribed in a sphere as a result of performing recording using a truncated triangular pyramid.

In order to diffract light incident on the first diffraction grating 920 in 3D directions, refractive indexes of the gratings of the second diffraction grating 930 may be distributed as shown in a first plan view 933a and a first side view 934a of FIG. 9. A second plan view 933b and a second side view 934b of FIG. 9 show results of connecting maximum refractive indexes shown in the first plan view 933a and the first side view 934a.

Figure 10:
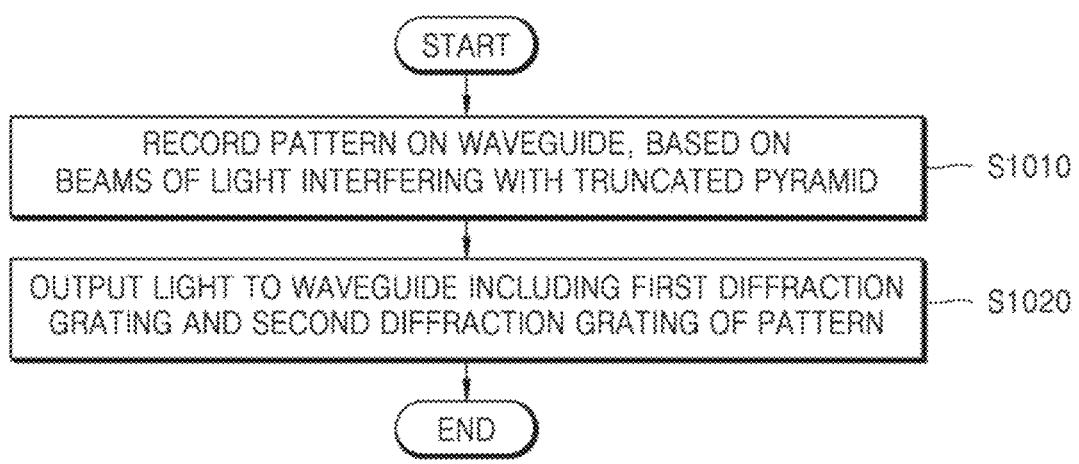
FIG. 10 is a flowchart of a method of outputting light by an optical device according to an embodiment.

FIG. 10 is a flowchart of a method of outputting light by an optical device according to an embodiment.

The optical device may record a pattern on a waveguide based on a plurality of beams of light interfering with a truncated pyramid (S1010). The recorded pattern forms a second diffraction grating and may be an optical pattern for diffraction in 3D directions.

For example, a pattern for diffracting light incident through four beams of light interfering with the truncated triangular pyramid in a 3D radial pattern may be recorded on the second diffraction grating provided on a waveguide included in the optical device.

In an embodiment, light-output efficiencies of gratings included in the second diffraction grating may be differently set to adjust the intensity of light output from the second diffraction grating. In an embodiment, a process of recording a pattern on the waveguide may be performed several times based on a plurality of beams of light interfering with a truncated pyramid.

The optical device may output light to a waveguide including a first diffraction grating and the second diffraction grating of the pattern (S1020).

For example, the optical device may output light forming a virtual image to the first diffraction grating. Thus, the light incident on the first diffraction grating may be diffracted in a 1D direction, and be thereafter incident on the second diffraction grating. The light incident on the second diffraction grating may be diffracted in 3D directions according to the pattern of the second diffraction grating.

In an embodiment, the optical device may more efficiently widen an EMB by diffracting light incident on a first diffraction grating in the 3D directions by using a second diffraction grating of a pattern recorded based on a plurality of beams of light interfering with an n-sided truncated pyramid.

Figure 11:
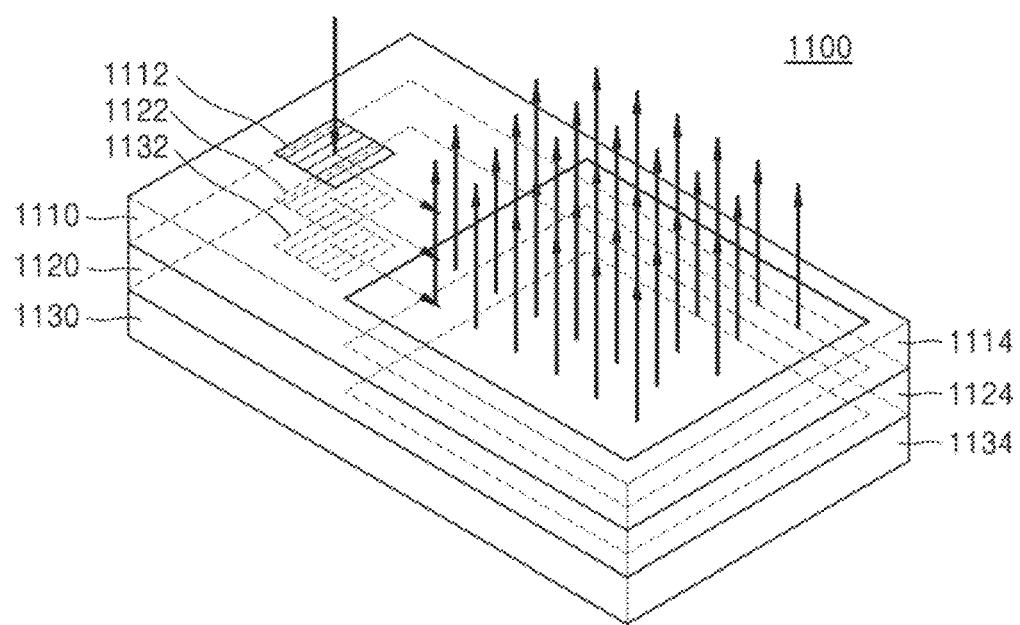
FIG. 11 is a diagram illustrating a structure of an optical device according to another embodiment.

FIG. 11 is a diagram illustrating a structure of an optical device 1100 according to an embodiment.

Referring to FIG. 11, the optical device 1100 may include a first waveguide 1110, a second waveguide 1120, and a third waveguide 1130 stacked together. A plurality of first diffraction gratings 1112, 1122, and 1132 may be respectively provided on the first waveguide 1110, the second waveguide 1120, and the third waveguide 1130, and a plurality of second diffraction gratings 1114, 1124, and 1134 may be respectively provided on the first waveguide 1110, the second waveguide 1120, and the third waveguide 1130.

The plurality of diffraction gratings 1112, 1122, and 1132 respectively provided on the first waveguide 1110, the second waveguide 1120, and the third waveguide 1130 may respectively diffract a certain wavelength in a 1D direction. For example, the plurality of first diffraction grating 1112 on the first waveguide 1110 may diffract light of an R image signal in a 1D direction, and the first diffraction grating 1122 on the second waveguide 1120 may diffract light of a G image signal in a 1D direction. The first diffraction grating 1132 on the third waveguide 1130 may diffract light of a B image signal in a 1D direction.

Each of the plurality of second diffraction grating 1114, 1124, and 1134 respectively provided on the first waveguide 1110, the second waveguide 1120, and the third waveguide 1130 may include gratings of a pattern for diffracting light incident thereon in 3D directions. Accordingly, light incident on the plurality of second diffraction grating 1114, 1124, and 1134 respectively provided on the first waveguide 1110, the second waveguide 1120, and the third waveguide 1130 may be output in the 3D directions, and thus may be perceived by a user who wears the optical device 1100.

A method according to an embodiment may be implemented in the form of a program instruction executable through various computer means and recorded on a computer-readable medium. The computer-readable medium may include program instructions, data files, a data structure, and the like solely or in combination. The program instructions recorded on the computer-readable medium may be specially designed and configured for the disclosure or be well known to and usable by one of ordinary skill in the art of computer software. Examples of the computer-readable medium include magnetic media (e.g., hard disks, floppy disks, and magnetic tapes), optical media (e.g., compact disc read only memories (CD-ROMs) and digital versatile discs (DVDs)), magneto-optical media (e.g., floptical disks), and hardware devices specially configured to store and execute program instructions (e.g., ROMs, random access memories (RAMs), and flash memories). The one or more instructions may include machine language codes generated by a compiler, and high-level language codes executable by a computer by using an interpreter.

Reference numerals are used in the embodiments illustrated in the drawings, and specific terms are used to describe the embodiments but the disclosure is not limited by the specific terms. The embodiments should be understood to include all elements that will be obvious to those of ordinary skill in the art.

Embodiments may be represented using functional block components and various operations. Such functional blocks may be realized by any number of hardware and/or software components configured to perform certain functions. For example, various integrated circuit components, e.g., memory, processing elements, logic elements, look-up tables, and the like, to carry out a variety of functions under control of at least one microprocessor or other control devices may be employed in the embodiments. Furthermore, the same or different types of cores, different types of central processing units (CPUs), etc. may be employed in the embodiments. As the elements are implemented using software programming or software elements, embodiments may be implemented with any programming or scripting language such as C, C++, Java, assembler, or the like, including various algorithms that are any combination of data structures, processes, routines or other programming elements. Functional aspects may be realized as an algorithm executed by at least one processor. In addition, the disclosure may employ prior art for electronics configuration, signal processing and/or data processing. The terms "mechanism", "element", "means", "configuration", etc. may be used broadly and are not limited to mechanical or physical components. These terms should be understood as including software routines in conjunction with processors, etc.

Particular implementations described in the embodiments are merely examples, and are not intended to otherwise limit the scope of the embodiments in any way. For the sake of brevity, a description of electronic components according to the related art, control systems, software and other functional aspects of the systems may be omitted here. The lines or connecting elements shown in the appended drawings are intended to represent exemplary functional relationships and/or physical or logical couplings between the various elements. It should be noted that many alternative or additional functional relationships, physical connections or logical connections may be present in practice. In addition, no item or component is essential to the practice of the disclosure unless it is specifically described as "essential" or "critical."

Recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein may be performed in an appropriate order unless otherwise indicated herein or otherwise clearly contradicted by context. Embodiments are not limited by an order in which the operations are described herein. The use of any and all examples, or exemplary terms (e.g., "such as") provided herein, is intended merely to clearly describe the embodiments of the disclosure and does not pose a limitation on the scope of the embodiments unless otherwise claimed.

Modifications and adaptations will be readily apparent to those of ordinary skill in this art without departing from the spirit and scope of the disclosure. It would be obvious to those of ordinary skill in the art that various modifications and changes may be made in the embodiments of the disclosure by changing design conditions and factors without departing from the scope of the following claims and their equivalents.

What is claimed is:

1. An optical device comprising:
a waveguide;
a first diffraction grating receiving at least a portion of light incident on the waveguide; and
a second diffraction grating receiving a light diffracted from the first diffraction grating,
wherein the first diffraction grating and the second diffraction grating are provided in or on the waveguide,
the light diffracted from the first diffraction grating is diffracted, in three-dimensional directions, from the second diffraction grating,
at least a portion of the light diffracted in the three-dimensional directions is output to an outside of the waveguide, and
the second diffraction grating includes gratings of a pattern based on directions of grating vectors corresponding to sides of a polyhedron inscribed in a sphere.

2. The optical device of claim 1,
wherein the light diffracted from the first diffraction grating to the second diffraction grating is diffracted in the three-dimensional directions based on a sum of a one dimensional direction of the light diffracted from the first diffraction grating to the second diffraction grating and the directions of the grating vectors.

3. The optical device of claim 1, wherein the second diffraction grating includes a volume grating.

4. The optical device of claim 1, wherein the second diffraction grating includes the gratings of which at least one of efficiency of diffraction in the three-dimensional directions or light-output efficiency are differently recorded.

5. The optical device of claim 1, wherein the optical device further includes a plurality of waveguides, each of the plurality of waveguides including the first diffraction grating and the second diffraction grating,
the plurality of waveguides are stacked, and
a red image signal light, a green image signal light, and a blue image signal light incident on the first diffraction grating and the second diffraction grating of each of the plurality of waveguides are selectively diffracted based on wavelength characteristics of the red image signal light, the green image signal light, and the blue image signal light.

6. The optical device of claim 1, wherein the second diffraction grating includes at least one of a photopolymer, gelatin, a silver halide, or a photoresist.

7. The optical device of claim 1, further comprising a processor configured to output light forming a virtual image to the first diffraction grating.

8. An optical device comprising:
a waveguide;
a first diffraction grating receiving at least a portion of light incident on the waveguide; and
a second diffraction grating receiving a light diffracted from the first diffraction grating,
wherein the first diffraction grating and the second diffraction grating are provided in or on the waveguide,
the light diffracted from the first diffraction grating is diffracted, in three-dimensional directions, from the second diffraction grating,
at least a portion of the light diffracted in the three-dimensional directions is output to an outside of the waveguide, and
the second diffraction grating includes gratings of a pattern recorded based on (n+1) beams of light interfering with an n-sided truncated pyramid.

9. A method of outputting light, the method comprising:
recording a pattern of a waveguide based on a plurality of beams of light interfering with a truncated pyramid, the waveguide providing a first diffraction grating and a second diffraction grating that includes the recorded pattern; and
outputting light to the first diffraction grating of the waveguide,
wherein at least a portion of the light incident on the first diffraction grating is diffracted to the second diffraction grating, a light diffracted from the first diffraction grating is diffracted, in three-dimensional directions, from the second diffraction grating, and
at least a portion of the light diffracted in the three-dimensional directions is output to an outside of the waveguide.

10. The method of claim 9, wherein the second diffraction grating includes gratings of a pattern based on directions of grating vectors corresponding to sides of a polyhedron inscribed in a sphere, and
wherein the light diffracted from the first diffraction grating to the second diffraction grating is diffracted in the three-dimensional directions based on a sum of a one-dimensional direction of the light diffracted from the first diffraction grating to the second diffraction grating and the directions of the grating vectors.

11. The method of claim 9, wherein the second diffraction grating includes gratings of a pattern recorded based on (n+1) beams of light interfering with an n-sided truncated pyramid.

12. The method of claim 9, wherein the second diffraction grating includes a volume grating.

13. The method of claim 9, wherein the second diffraction grating includes gratings of which at least one of efficiency of diffraction in the three-dimensional directions or light-output efficiency are differently recorded.

14. The method of claim 9, wherein the outputting of the light to the first diffraction grating of the waveguide comprises:
outputting a red image signal light, a green image signal light, and a blue image signal light, and
wherein the red image signal light, the green image signal light, and the blue image signal light incident on a first diffraction grating and a second diffraction grating of a plurality of waveguides are selectively diffracted based on wavelength characteristics of the red image signal light, the green image signal light, and the blue image signal light.

15. The method of claim 9, wherein the second diffraction grating includes at least one of a photopolymer, gelatin, a silver halide, or a photoresist.

* * * * *